(12) United States Patent  
Fu (10) Patent No.: US 8,744,473 B2  
(45) Date of Patent: Jun. 3, 2014

(54) DOWNLINK LIMITED-FEEDBACK INTERFERENCE ALIGNMENT WITH CONSTANT AMPLITUDE CODEBOOKS AND RATE BALANCE SCHEDULING

(75) Inventor: Yu Fu, Kanata (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 27 days.

(21) Appl. No.: 13/438,983

(22) Filed: Apr. 4, 2012

(65) Prior Publication Data

US 2013/0267240 A1 Oct. 10, 2013

(51) Int. Cl.
*H04W 72/08* (2009.01)
*H04W 88/02* (2009.01)
*H04B 15/00* (2006.01)

(52) U.S. Cl.
USPC ............................ 455/452.2; 370/337

(58) Field of Classification Search
USPC ............... 455/450–454, 501; 370/280–285; 375/296, 316
See application file for complete search history.

(56) References Cited

U.S. PATENT DOCUMENTS

| 8,036,098 | B2 | 10/2011 | Pereira et al. | |
|---|---|---|---|---|
| 2010/0124887 | A1* | 5/2010 | Wellington | 455/69 |
| 2010/0226293 | A1 | 9/2010 | Kim et al. | |
| 2010/0227613 | A1 | 9/2010 | Kim et al. | |
| 2010/0227635 | A1 | 9/2010 | Kim et al. | |
| 2010/0248712 | A1 | 9/2010 | Lee et al. | |
| 2011/0051837 | A1* | 3/2011 | Park et al. | 375/285 |
| 2011/0194540 | A1* | 8/2011 | Baligh et al. | 370/337 |

OTHER PUBLICATIONS

Jagannatham, A. et al., "A Semi-Blind Technique for MIMO Channel Matrix Estimation," Signal Processing Advances in Wireless Communications, 2003, SPAWC 2003, 4th IEEE Workshop, Jun. 15-18, 2003, pp. 304-308, ISBN: 0-7803-7858-X, entire article.

Lee, N. et al., "Interference Alignment with Limited Feedback on Two-Cell Interfering Two-User MIMO-MAC," http://arxiv.org/abs/1010.0933, Jan. 25, 2012, entire article.

Thukral, J., et al. "Interference Alignment with Limited Feedback," http://arxiv/0905.0374v2/cs.IT, IEEE 1st 2009, pp. 1759-1763, Jun. 2009, entire article.

* cited by examiner

*Primary Examiner* — Kashif Siddiqui (74) *Attorney, Agent, or Firm* — Potomac Patent Group PLLC (57) ABSTRACT

Downlink interference alignment schemes are described which provide, among other things, channel state information (CSI) from the UEs using a constant amplitude codebook. By providing only phase information associated the UEs' channel states, instead of both amplitude and phase information, fewer bits can be used to inform the BSs of the UEs effective channels, thereby reducing the bandwidth requirements associated with the transmission of CSI by UEs for downlink interference alignment purposes. According to other embodiments, feedback information can be used to perform user selection scheduling and rate balancing.

16 Claims, 10 Drawing Sheets

DOWNLINK LIMITED-FEEDBACK INTERFERENCE ALIGNMENT WITH CONSTANT AMPLITUDE CODEBOOKS AND RATE BALANCE SCHEDULING

TECHNICAL FIELD

The present invention relates generally to telecommunications systems, and in particular, to methods, systems, devices and software associated with downlink limited-feedback interference alignment techniques.

BACKGROUND

Radio communication networks were originally developed primarily to provide voice services over circuit-switched networks. The introduction of packet-switched bearers in, for example, the so-called 2.5G and 3G networks enabled network operators to provide data services as well as voice services. Eventually, network architectures will likely evolve toward all Internet Protocol (IP) networks which provide both voice and data services. However, network operators have a substantial investment in existing infrastructures and would, therefore, typically prefer to migrate gradually to all IP network architectures in order to allow them to extract sufficient value from their investment in existing infrastructures. Moreover, to provide the capabilities needed to support next generation radio communication applications, while at the same time using legacy infrastructure, network operators could deploy hybrid networks wherein a next generation radio communication system is overlaid onto an existing circuit-switched or packet-switched network as a first step in the transition to an all IP-based network. Alternatively, a radio communication system can evolve from one generation to the next while still providing backward compatibility for legacy equipment.

One example of such an evolved network is based upon the Universal Mobile Telecommunications System (UMTS) which is an existing third generation (3G) radio communication system that is evolving into High Speed Packet Access (HSPA) technology. Yet another alternative is the introduction of a new air interface technology within the UMTS framework, e.g., the so-called Long Term Evolution (LTE) technology. Target performance goals for LTE systems include, for example, support for 200 active calls per 5 MHz cell and sub 5 ms latency for small IP packets. Each new generation, or partial generation, of mobile communication systems add complexity and abilities to mobile communication systems and this can be expected to continue with either enhancements to proposed systems or completely new systems in the future.

Figure 1:
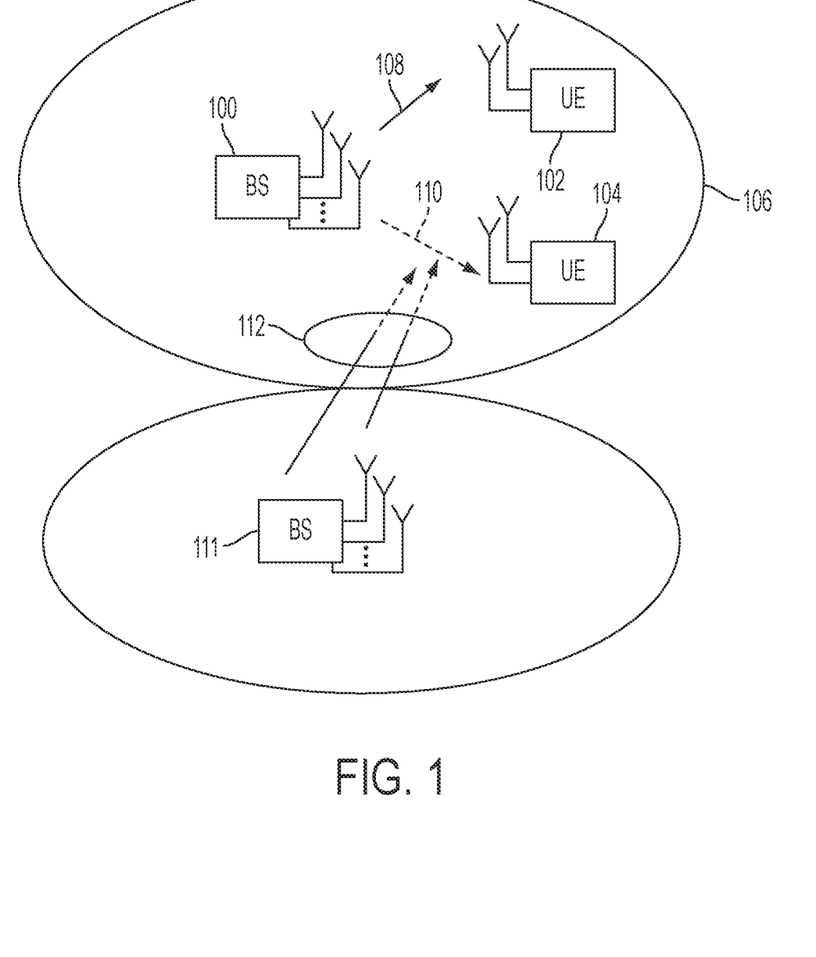
FIG. 1 illustrates concepts associated with intracell and intercell interference.

As such new systems and technologies enter the marketplace, the general trend is to support more users and greater bandwidth in a given geographic area. This gives rise to more and more interference between transmitters and receivers operating in close proximity to one another. FIG. 1 illustrates some basic interference concepts. Therein, a base station (BS) 100 transmits radio signals on the downlink towards user equipments (UEs) 102 and 104 within its cell 106. For example, BS 100 can transmit a signal 108 which is intended for reception on a downlink radio bandwidth resource by UE 102. At the same time, however, BS 100 may transmit a signal 111 intended for reception by UE 104. Some portion of the signal energy associated with signal 111 may interfere with the reception of the signal 104 by UE 102, which type of interference is sometimes referred to as "intracell" interference. Similarly, other base stations associated with neighboring cells may also be transmitting signals which can be received by UE 102 in a manner which overlaps with its reception of signal 108. An example of such "intercell" interference is shown in FIG. 1 as BS 111 transmitting signals 112.

Various techniques have been used historically to combat interference, e.g., orthogonal channelization, interference rejection, etc., in order to increase channel capacity. Downlink interference alignment is a relatively new, joint transmitter-receiver strategy that attempts to align interfering signals. In MIMO networks, for example, interference alignment uses the spatial dimension offered by multiple antennas for alignment. The main concept behind downlink interference alignment techniques is that UEs coordinate their downlink transmissions from the BSs, and the base stations' transmitters use a precoding scheme, such that the downlink interference signals lie in a reduced dimensional subspace at each UE's receiver relative to the desired downlink signal.

However, this technique requires feedback from the UEs in the form of channel state information (CSI) to be transmitted to the network. The transmission of CSI information by the UEs reduces the available bandwidth for the transmission of other data in these systems.

ABBREVIATIONS/ACRONYMS

BS Base Station
CDI Channel Directional Index
CQF Channel Quality Factor
CQI Channel Quality Information
HSPA High Speed Packet Access
IA Interference Alignment
IP Internet Protocol
LTE Long Term Evolution
MAC Medium Access Layer
MIMO Multiple Input Multiple Output
SINR Signal-to-Interference Noise Ratio
THP Tomlinson-Harashima precoding
UE User Equipment
ZF Zero Forcing

SUMMARY

Embodiments described herein propose, among other things, providing CSI feedback from the UEs using a constant amplitude codebook. By providing only phase information associated the UEs' channel states, instead of both amplitude and phase information, fewer bits can be used to inform the BSs of the UEs effective channels, thereby reducing the bandwidth requirements associated with the transmission of CSI by UEs for downlink interference alignment purposes. According to other embodiments, feedback information can be used to perform user selection scheduling and rate balancing.

According to an embodiment, a method for transmitting downlink signals in a radio communication system includes receiving, at a base station, encoded feedback information associated with channels between the base station and a plurality of user equipments, wherein the encoded feedback information is encoded using a constant amplitude codebook. The base station can also transmit downlink signals toward the plurality of user equipments in a manner which is based on a downlink interference alignment scheme that uses the encoded feedback information.

According to an embodiment, a base station includes a transceiver configured to receive encoded feedback information associated with channels between the base station and a plurality of user equipments, wherein the encoded feedback information is encoded using a constant amplitude codebook. The transceiver is further configured to transmit downlink signals toward the plurality of user equipments in a manner which is based on a downlink interference alignment scheme that uses the encoded feedback information.

According to an embodiment, a user equipment includes a transceiver configured to receive a downlink signal; and a processor configured to process the received downlink signal to determine an effective channel associated with the received downlink signal. The processor is further configured to determine constant amplitude codebook feedback information associated with the effective channel. The transceiver is further configured to transmit the constant amplitude codebook feedback information toward a base station.

According to another embodiment, a method for receiving downlink signals in a radio communication system includes receiving a downlink signal and processing the received downlink signal to determine an effective channel associated with the received downlink signal. Constant amplitude codebook feedback information associated with the effective channel, which information is transmitted toward a base station, e.g., for usage in a downlink interference alignment scheme.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 2:
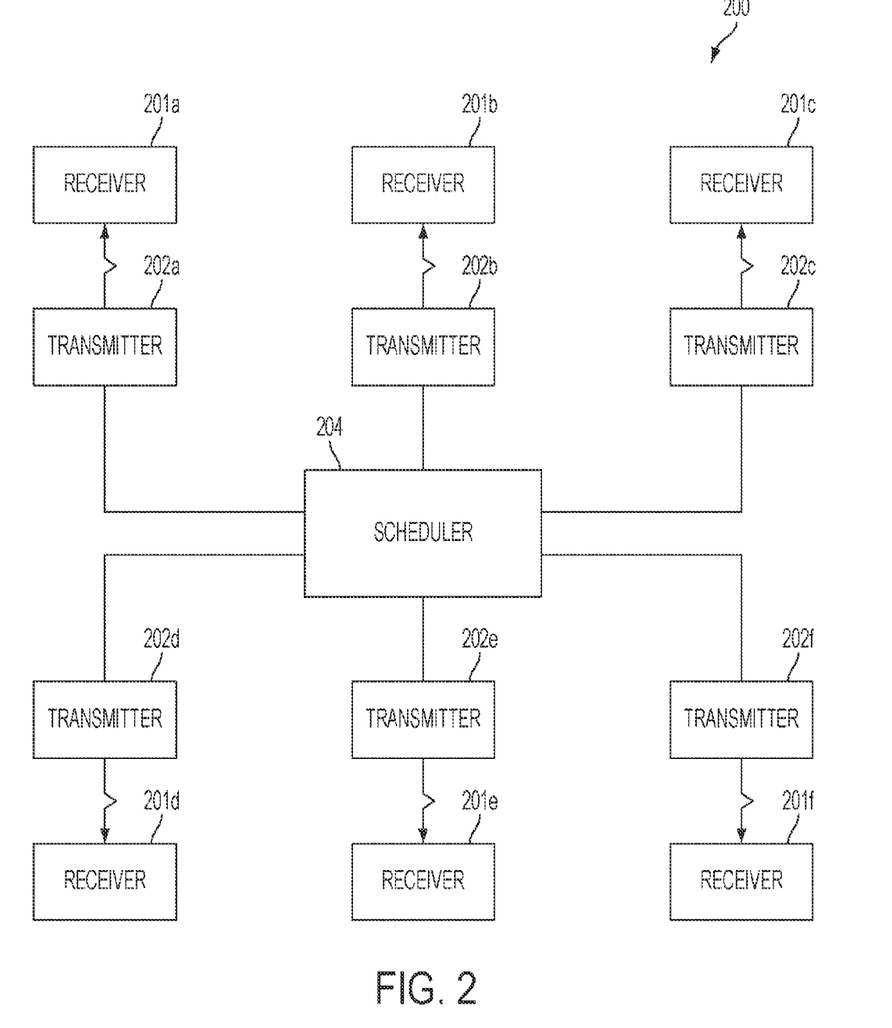
FIG. 2 depicts transmitter-receiver pairs in a downlink interference alignment scheme.

FIG. 2 illustrates a generalized radio communication system 200 in which exemplary embodiments can be implemented. The radio communication system 200 can be centralized, e.g., such as a cellular radio network having centralized control nodes, or decentralized (ad hoc) with distributed control functionality. Regardless of the type of radio communication network into which the embodiments are implemented, there will be a paired relationship between receivers 201a-201f and corresponding transmitters 202a-202f, as illustrated. Although only six receiver-transmitter pairs are illustrated in FIG. 2, it will be appreciated by those skilled in the art that, in practice, a radio communication system 200 may have many more receiver-transmitter pairs. In a cellular system, the transmitters may be associated with base stations, the receivers may be associated with mobile stations or user equipments and there may be multiple paired relationships associated with each base station. In other radio communication systems, the paired relationships may be between other types of devices, e.g., between access points and user equipments or between master devices and slave devices.

A central scheduler function 204 is provided with bidirectional communication links with each transmitter 202a-f (wireline or wireless). The central scheduler function 204 receives channel state information (CSI) associated with the channels between the transmitters 202a-f and the corresponding receivers 201a-f and uses the CSI information to determine, for example, which receiver-transmitter pairs to group together for downlink interference alignment purposes (sometimes referred to as "clustering") and how to coordinate the transmissions within each group from each transmitter to its corresponding receiver in a manner which minimizes downlink interference. For those readers interested in more information regarding the grouping of receiver-transmitter pairs, as well as downlink interference alignment in general, she or he is directed to U.S. Pat. No. 8,036,098, the disclosure of which is incorporated here by reference. Although shown as a separate entity in FIG. 2, the central scheduling function 204 can be disposed in any desired node in the radio communication system 200, e.g., within a transmitter 202a-f (e.g., a base station) or within another node in the network (e.g., a network node in a radio access network).

The receivers 201a-f provide (transmit) the CSI information to their corresponding transmitters 202a-f over an air interface. In this sense both receivers 201a-f and transmitters 202a-f could more accurately be described as "transceivers" since all of these units possess both functionalities, however the receiver-transmitter labels are adopted to emphasize the focus on downlink interference mitigation. Conventionally, interference alignment techniques were designed to operate based on an assumption that the transmitter and/or scheduler had a perfect understanding of the effective channel experienced by each receiver. Naturally, this requires each receiver to transmit enough feedback information about its effective channel for a complete characterization of the channel to be made by the transmitter and/or scheduler. However, more recently, there has been research into performing interference alignment with a limited amount of feedback, see, e.g., "Interference Alignment with Limited Feedback", authored by Jatin Thukral and Helmut Bölcskei, IEEE IST 2009, pp. 1759-1763, June 2009, to reduce the amount of feedback required to be transmitted while still achieving the maximum sum rate, i.e., a maximized sum of the data rates provided on the channels in a group or cluster. Another example of a limited feedback downlink interference alignment is provided by an article authored by N. Lee, W. Shin, and B. Clerckx, entitled "Interference alignment with limited feedback on two-cell interfering two-user MIMO-MAC", which proposes quantizing the receiver beamforming vectors.

According to exemplary embodiments, however, it is instead proposed to provide a limited feedback, downlink interference alignment which uses a constant amplitude codebook to provide feedback for the downlink interference alignment scheme. In addition to reducing the bandwidth over the air interface needed to provide feedback from the receivers to the transmitters about their channel states, embodiments which use a constant amplitude codebook to provide such feedback are shown to achieve higher sum rates than other limited feedback schemes.

To provide some context for the derivation and usage of a constant amplitude codebook for limited feedback interference alignment according to an embodiment, consider that for downlink, multi-cell radio communication systems, the received signal $Y_l$ for all users can be expressed as:

$$Y_l = H_l X_l + H_i X_i + W \quad (1)$$

where:
$H_l X_l$ is the intra-cell receive vector, including the desired signal and the intra-cell interference;
$H_i X_i$ is the inter-cell interference from the i-th cell; and
W is noise.

According to this embodiment, each user generates a null vector $u_{k,l}$ to mitigate inter-cell interference. More specifically, each UE can determine the null vector $u_{k,l}$ which satisfies the equation:

$$u_{k,l} H_l X_i = 0 \quad (2)$$

All the beamforming vectors $u_{k,l}$, k=0, 1, ..., K, from all the receivers (e.g., UEs) can be used by the scheduler 200 to construct a matrix $U_l$ for the l-th cell. For simplicity, the cell index l is omitted in the discussion below. The effective channel is hence F=UH. Each receiver 201a-201f (e.g., UE) thus needs to send back feedback information which identifies its current, effective channel $F_k$ to the corresponding transmitter 202a-202f (e.g., BS or BTS), which can then forward that information on to the scheduler 200. In this context, the effective channel $F_k$ would be fully characterized by providing complete information about how the channel impacts the amplitude and phase of the information bits in the desired signal as it is transmitted over the air interface between the transmitter 202a-f and the corresponding receiver 201a-f.

According to exemplary embodiments, a constant-amplitude codebook is proposed for channel quantization so that each user, UE or receiver does not need to explicitly send all of the bits which fully characterize its effective channel back to the transmitter. Instead, the constant amplitude codebook is used to provide, as feedback, only information about the phase of the effective channel experienced by the desired signals which are detected by the receiver. The constant amplitude codebook $\zeta_k = \{C_{k1}, C_{k2}, \ldots, C_{kN}\}$ is generated by random vector quantization where $N=2^b$ quantization vectors are independently chosen, can designed off-line, and is known at both the transmitter and the receiver. In operation, each user, UE or receiver quantizes the direction of its channel $\dot{F}_k = F_k/\|F_k\|$ to a unit norm vector $\dot{F}_k$. The quantization is chosen from the codebook $\dot{F}_k = C_{kn}$ according to minimum distance criterion, i.e.:

$$\dot{F}_k = C_{kn}, n = \mathrm{argmin} \|\dot{F}_k - C_{ki}\|_{i=1,\ldots,N}, N=2^b \quad (3)$$

In this way, embodiments described herein reduce the number of feedback bits which need to be transmitted back to the transmitter to b bits associated with the channel's phase information. The number of bits which can be saved from being transmitted as feedback, i.e., the channel's amplitude information, can be log 2(M), where M is on the order of the number of transmit antennas being used by the UE to transmit the feedback information. Upon receipt of all of the feedback, the scheduler 200 will have the quantized channel $\dot{F}$, constructed by $\dot{F}_k$ from all the users, UEs or receiver of interest in the system.

Figure 3A:
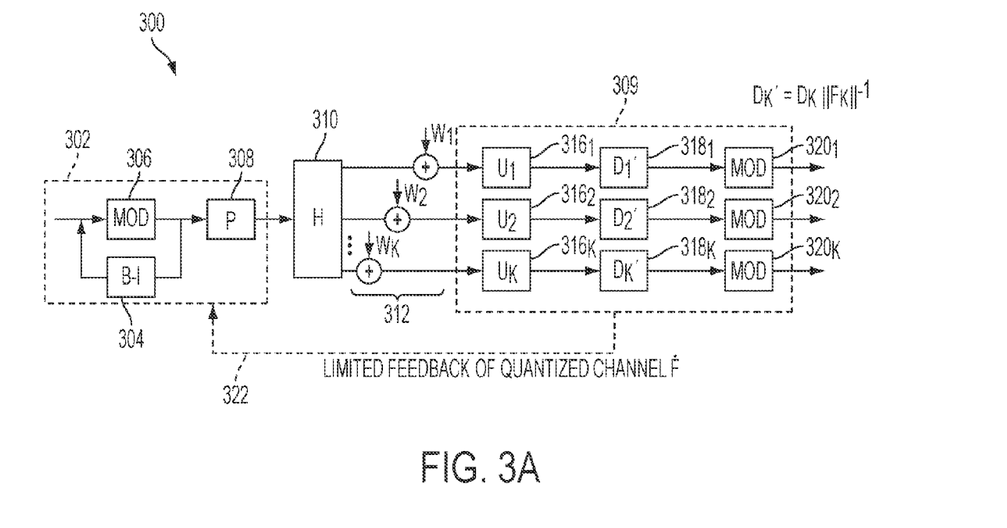
FIG. 3(a) shows a radio communication system employing non-linear precoding and constant amplitude codebook feedback information according to an embodiment.

FIG. 3(a) illustrates an example of a radio communication system 300 which includes non-linear Tomlinson-Harashima precoding (THP) scheme for implementing downlink interference alignment according to an exemplary embodiment which uses a constant amplitude codebook to facilitate feedback from the receiver to the transmitter. Therein, at the transmitter 302, element 304 is the non-linear portion of the transmitter including application of the matrix B which is a precoding, feedback matrix, element 306 performs a modulo function 306 on the feedback signal to be transmitted and linear feedforward filter 308 applies a scaling factor P output of the modulo function which is intended to maintain a constant transmitter output power. The element 306, i.e., the modulo device, is the non-linear portion of the transmitter in this embodiment. By passing through the feedback structure (elements 304 and 306), the transmitted symbols are successively calculated. Element 306 is, according to this embodiment, a non-linear modulo-2*sqrt(M) device, where M is the constellation size, i.e., we use M-ary modulation. Mathematically, the non-linear portion adds integer of multiples of 2*sqrt(M) to the real and imaginary parts of the original inputs, respectively.

The transmitted signal then passes via an air interface to receiver 309, where the channel effects on the transmitted signal are modeled as application of a channel matrix H 310 and noise 312 associated with the various radio paths 1 ... k between the transmitter 302 and the receiver 309. Upon reception, the signal is processed on a per antenna basis using an equalization feed forward matrix $U_1 \ldots U_k$ 316 to perform the inverse of the matrix operations B and P at the transmitter 302, as well as the channel effects H. The equalized signal rays in each processing path then have a scaling matrix D' applied thereto via elements $318_1 \ldots 318_k$ to perform channel decomposition and a reverse modulo function is applied via elements $320_1 \ldots 320_k$.

Using the notation of the exemplary THP radio communication system 300 shown in FIG. 3(a), and when a constant amplitude codebook as described above is applied to the THP system 300, the quantized channel $\dot{F}$ and precoding matrix B can be determined as:

$$\dot{F} = RP^H, \text{ and} \quad (4)$$

$$B = DR \quad (5)$$

where: D is a scaling matrix such that $D'_k = D_k \|F_k\|^{-1}$
and R is an upper triangular matrix by QR decomposition, and P is a unitary matrix. As shown generally in FIG. 3(a) via dotted line 322, the receiver 309 uses the received signal and the above-described equations to determine its effective channel $\dot{F}$ and provide feedback information back to the transmitter 302. If the channel amplitude information were to be considered for provision as part of the feedback information, i.e., if a non-constant amplitude codebook is used, then the amplitude information $A=\text{diag}[\|F_1\|, \|F_2\|, \ldots, \|F_K\|]$ would also be sent back to the transmitter 302. However, by applying RQ decomposition, which breaks a matrix M into two matrices R and Q, where R is an upper triangular matrix, to equation (4):

$$A\dot{F}=ARP^H=R'P^H$$

where $R'=AR$, it can be seen that the amplitude matrix A is absorbed by the triangular matrix R'. This means that the same feed forward matrix P will be determined by the transmitter 302 whether the channel amplitude is included in, or excluded from, the feedback information 322 in a THP radio communication system 300. Thus, for codebook design according to various embodiments, channel amplitude information does not need to be considered and instead a constant-amplitude codebook thus can achieve a more accurate channel quantization and/or use fewer feedback bits to characterize the channel quantization.

Figure 3B:
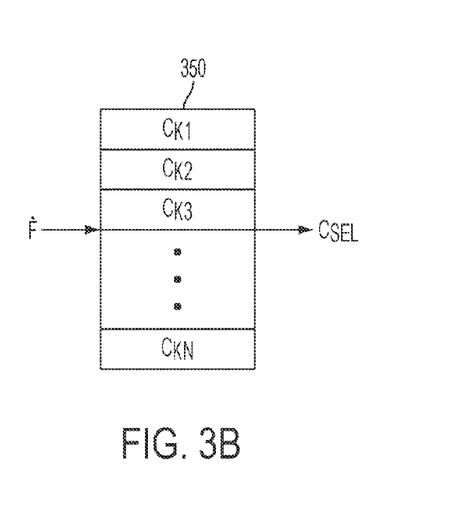
FIG. 3(b) illustrates using an effective channel value to index a constant amplitude codebook according to an embodiment.

Generally speaking, the usage of the determined effective channel $\dot{F}$ to select a channel quantization from a codebook 350 is shown in FIG. 3(b). Therein, once the receiver 309 has estimated $\dot{F}$, that value can be used to index the codebook 350 and select a corresponding codebook value (Csel) which represents a quantized value associated with the channel's phase. The selection of a corresponding codebook value relative to a value of $\dot{F}$ can be based on a minimum "distance" (e.g., in an MMSE sense) from the value $\dot{F}$ to the selected codebook value Csel. The receiver 309 can then transmit the value Csel back to the transmitter 302 in an appropriate downlink interference alignment feedback message or field. The transmitter 302 can then use the value Csel to, for example, update the values of B and/or P.

Figure 4:
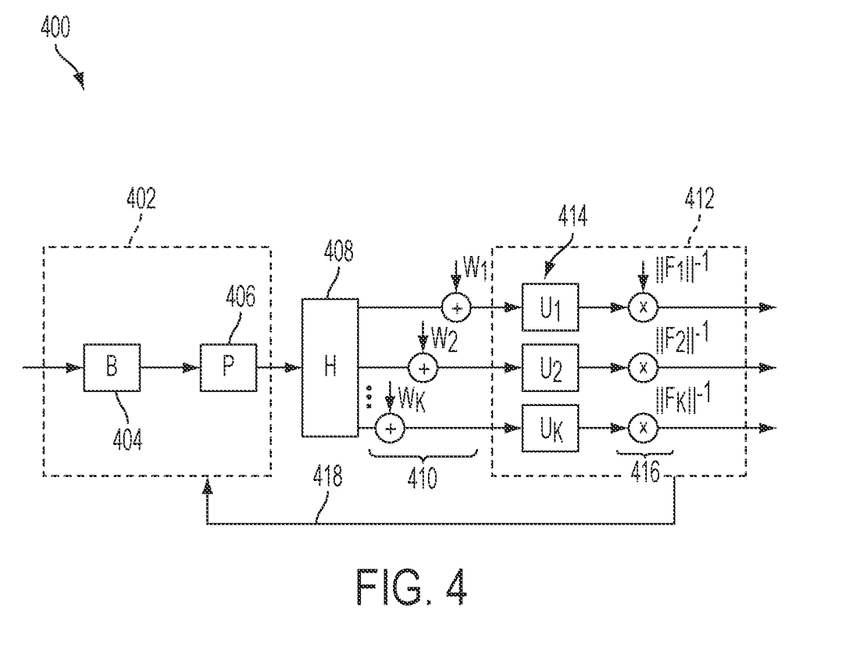
FIG. 4 shows a radio communication system employing linear precoding and constant amplitude codebook feedback information according to an embodiment.

While the embodiment of FIG. 3(a) describes a non-linear THP radio communication system, the present invention is not limited to such embodiments. For example, a radio communication system employing a linear interference alignment (IA) scheme can also use a constant-amplitude codebook to provide downlink interference alignment feedback according to another embodiment. An example of a radio communication system 400 having a linear IA scheme according to such an embodiment is illustrated in FIG. 4. Therein, the transmitter 402 applies, among other processing, a precoding matrix B 404 and feed forward matrix P 406 to the signal to be transmitted. As described previously, the transmitted signal experiences both channel effects, represented by matrix H 408, and noise, represented by a set of weights w1-wK 410.

The resulting signal is received by receiver 412, where it is compensated using an equalization feed forward matrix $U_1 \ldots U_k$ 414 to perform the inverse of the matrix operations B and P which were performed at the transmitter 402, as well as the channel effects H. However, in this embodiment, the amplitude matrix also needs to be compensated at each user's receiver 412 by applying $\|F_2\|^{-1} \ldots \|F_k\|^{-1}$ in elements 416 since the amplitude effects are relevant in the linear IA scheme. That is, in the linear scheme, $B=[UHP]^{-1}$, such that it pre-equalizes the cascade matrices of UHP. As in the embodiment of FIG. 3(b), the receiver 412 determines the effective channel $\dot{F}$ to select a channel quantization from a codebook, which represents a quantized value associated with the channel's phase. The receiver 412 can then transmit the value Csel back to the transmitter 402 in an appropriate downlink interference alignment feedback message or field. The transmitter 402 can then use the value Csel to, for example, update the values of B and/or P.

Figure 5:
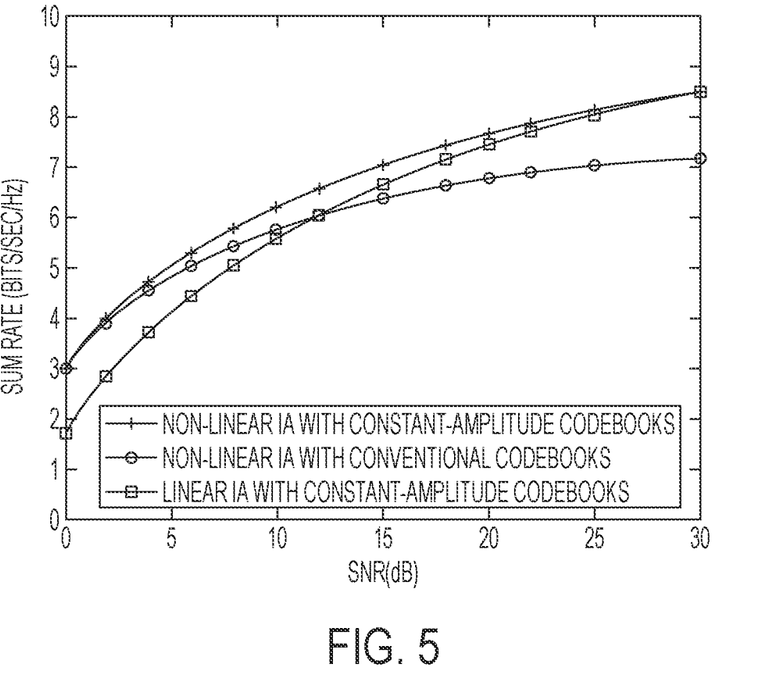
FIG. 5 is a graph showing simulation results comparing various embodiments with a conventional non-linear interference alignment.

The limited-feedback IA embodiments with a constant-amplitude codebook described above reduce the number of feedback bits needed to perform interference alignment, are more accurate for channel quantization and can also provide a higher sum-rate (total throughput). As evidence of these potential benefits, FIG. 5 is a graph showing simulation results the sum-rate performance of both linear and non-linear IA schemes using a constant-amplitude codebook relative to a non-linear IA using a conventional codebook, for a simulation system using four transmit antennas and having two users in each cell. The graph of FIG. 5 indicates that the proposed IA scheme with a constant-amplitude codebook outperforms the conventional scheme with a non-constant amplitude codebook. The reason is that the proposed scheme does not include the channel amplitude information which is not needed for a THP design. The channel quantization error of the proposed scheme is hence smaller. The advantage is more prominent in a high SNR region of the graph as the sum rate is determined by quantization error in this region. Additionally, the non-linear IA scheme outperforms the linear ZF IA scheme in the low and medium SNR regions of the graph since the non-linear precoding is an instance of dirty paper coding. In the high SNR region of the graph of FIG. 5, both linear and non-linear IA schemes are limited by the quantization error.

According to other embodiments, scheduling of downlink transmissions to users in a cluster of a downlink interference alignment system can be enhanced by using channel quality indication (CQI), or signal to interference noise ratio (SINR), information. More specifically, embodiments contemplate the usage of such channel quality feedback information for scheduling which applies user selection diversity and rate balancing as will now be described.

Figure 6:
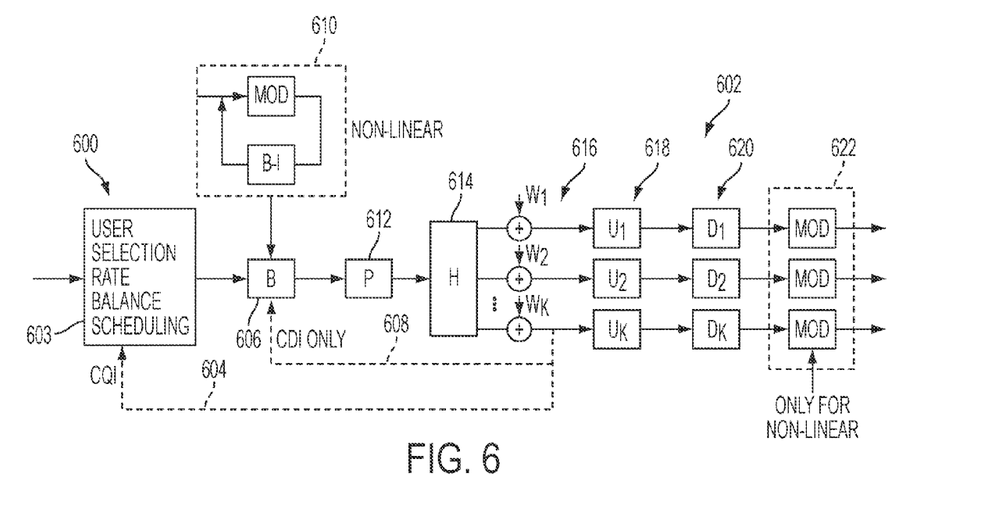
FIG. 6 shows a radio communication system employing user selection scheduling and rate balancing according to an embodiment.

To provide some context for such scheduling embodiments, FIG. 6 illustrates a radio communication system in which certain feedback information is provided to a transmitter 600 by a receiver 602. To reduce the number of Figures, FIG. 6 depicts both the linear and non-linear schemes as will be explained below. According to this embodiment, the scheduler 603 receives a channel quality indication (CQI), as represented by dotted arrow 604, whereas the precoder 606 which applies precoding matrix B to the signal to be transmitted receives the CDI (phase) information, i.e., via a constant amplitude codebook encoded field in a feedback signal, as indicated by dashed arrow 608 and described previously. The CQI information and CDI information can be provided by the receiver 602 to the transmitter 600 in one signal, although this is not required. If implemented using the non-linear THP scheme described previously, precoder block 606 would be replaced by non-linear portion 610.

The remainder of the system of FIG. 6 is similar to those systems described above with respect to FIGS. 3(a) and 4. The transmitted signal is impacted by channel effects 614 and noise 616. The received signal is compensated by elements 618, channel decomposition is performed by elements 620 and, if a non-linear IA scheme is being implemented, a modulo function 622 is performed.

Figure 7:
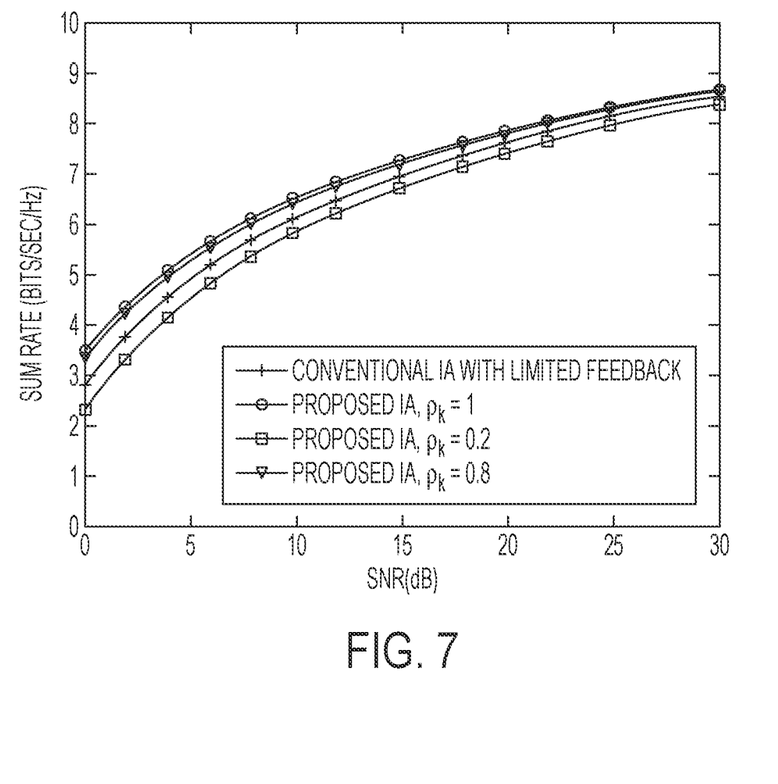
FIG. 7 is a graph showing simulation results comparing embodiments having user selection scheduling and rate balancing with a conventional interference alignment system having limited feedback.

In terms of the scheduling aspects of the embodiment of FIG. 6, these aspects can be implemented as illustrated, for example, in the flow diagram of FIG. 7. Therein, at step 700, the CQI and SINR are calculated for each receiver 602 in a downlink IA system. For embodiments wherein it is desirable to achieve multiuser selection gain, the CQI with channel amplitude information is sent back by the receivers 602 to the transmitter 602 and/or scheduler 603, in addition to the CDI at step 702.

The scheduler 603 then sorts the users in the order in which their reported CQI decreases. Thus, the user who has the highest CQI is the first whose transmitted signal is scheduled to pass through elements 606 (or 610 if a non-linear system is used) and 612 for transmission by, e.g., a base station transmitter on a downlink radio resource, as shown by step 704. As will be discussed in more detail below, user selection scheduling according to this exemplary embodiment achieves a higher sum rate than the conventional IA scheme, while rate balancing causes a slightly lower sum rate while ensuring fairness among users.

To provide some more detail regarding the determination of CQI and SINR in step 700 of the embodiment of FIGS. 6 and 7, consider that in this downlink IA scheme, the received vector can be expressed as:

$$Y = DFPRX + W \quad (6)$$

where:
F=UH is the effective channel sent from the receiver 602 to the transmitter 604;
U is the receive matrix coordinated by users to mitigate the inter-cell interference;
P is unitary matrix;
$R = [DFP]^{-1}$ and pre-equalizes the cascade channel matrices of DFP;
D is a diagonal scaling matrix with the normalized factors $d_k$ to meet the transmit power constraint; and
W is noise.

Using a constant-amplitude codebook, equation (6) can be rewritten as:

$$Y = A\dot{D}(\dot{F}+\Delta)\dot{P}RX + W' = AX + A\dot{D}\Delta\dot{P}RX + W' \quad (7)$$

where:
$A = \text{diag}[\|F_1\|, \|F_2\|, \ldots, \|F_K\|]$ is the channel amplitude matrix (in the transmitter 600, A is absorbed in $\dot{R}$);
$\Delta = F - \dot{F}$ is the difference between the quantized effective channel and the original channel;
$\dot{P}$ is a unitary matrix which does not affect the power of interference part; and
$W' = \dot{D}W$ is the post-detection noise.

The signal of the i-th user is then given by:

$$y_i = \|F_i\| x_i + \|F_i\| d_k \Delta \dot{P} RX + w_i' \quad (8)$$

With this framework, the SINR of the i-th user is hence given by:

$$SINR_i = \frac{\|F_i\|^2 P}{d_i^2 \|F_i\|^2 \|\Delta_i\|^2 P + d_i^2 K} \quad (9)$$

And, since $d_k$ is known at the transmitter 600, the CQI of the i-th user can be calculated as:

$$CQI_i = \frac{\|F_i\|^2 P}{\|F_i\|^2 \|\Delta_i\|^2 P + K} \quad (10)$$

Considering now the user rate selection scheduling according to embodiments, and after calculating the CQI as described above, the receivers 602 can transmit the CQI back to the transmitter 600 as feedback. Then, based on each user's CQI, the transmitter 600 or scheduler 603 performs user selection to sort the users based on their reported CQIs. The first user is selected from all the K users as:

$$\text{argmax}[CQI_i], i=1,2,\ldots,K \quad (11)$$

According to this embodiment, the transmitter 600 or scheduler 603 sorts users (receivers) as their CQI decreases. Thus, the user with the highest CQI will be the first to have its downlink signal sent to the feedback matrix B 606 for processing and subsequent transmission by, e.g., the base station. The user with lowest CQI of the user set will be the last one to have its downlink signal pass the feedback matrix 606, such that with each transmission, the next input to the feedback filter 606 has a largest CQI among all the other users who remain to be scheduled for transmission among, e.g., the cluster of users that are grouped together in a downlink interference alignment set. User selection scheduling according to this exemplary embodiment improves the overall system quality as it minimizes the possibility of error propagation, and hence maximizes the sum rate for downlink IA schemes with limited feedback.

The user selection scheduler 603 according to the foregoing embodiment sorts the users according to their CQIs as described above and, therefore, the users are more likely to be selected when they experience good channel conditions. However, some users will always have better channel quality than others and hence have high opportunism when using the user selection scheduling mechanism according to the foregoing embodiment. Thus a rate balancing mechanism can be added according to an embodiment for the users who do not have good channel conditions to ensure fairness of transmission opportunities. The channel quality factor (CQF) $\rho_k$ (k=1, 2, . . . , K) is used according to an embodiment to determine the balance of fairness and opportunism. In this context a $\rho_k = 1$ value means the scheduler 603 is only dependent on channel quality and a $\rho_k = 0$ value means that every user will have a resource regardless of its channel condition. According to embodiments, different users can be provided with different CQF values within the range of 0-1 to perform rate balancing, which values can, for example, be managed by operators to adjust the data rate for different users in the same cell.

FIG. 7 illustrates exemplary simulation results associated with the embodiment of FIG. 6 wherein the sum rate (throughout) of the proposed IA scheme with user selection and rate balancing is plotted as a function of signal to noise ratio (SNR) for various CQF factors, as well as showing a comparable plot for a conventional IA scheme with limited feedback. As described above, the proposed scheme sorts the users in optimal order according to their CQI, and therefore outperforms the conventional IA scheme without user selection. If the value of CQF is as low as 0.2, then it can be seen in FIG. 7 that the proposed scheme has a lower sum rate than the conventional scheme but ensures more fairness. If the value of CQF is as high as 0.8, the sum rate is about the same as when the opportunism value $\rho_k = 1$. Hence, by adjusting the CQF, an operator can achieve a balance of the trade-off between opportunism and fairness according to this embodiment.

Figure 8:
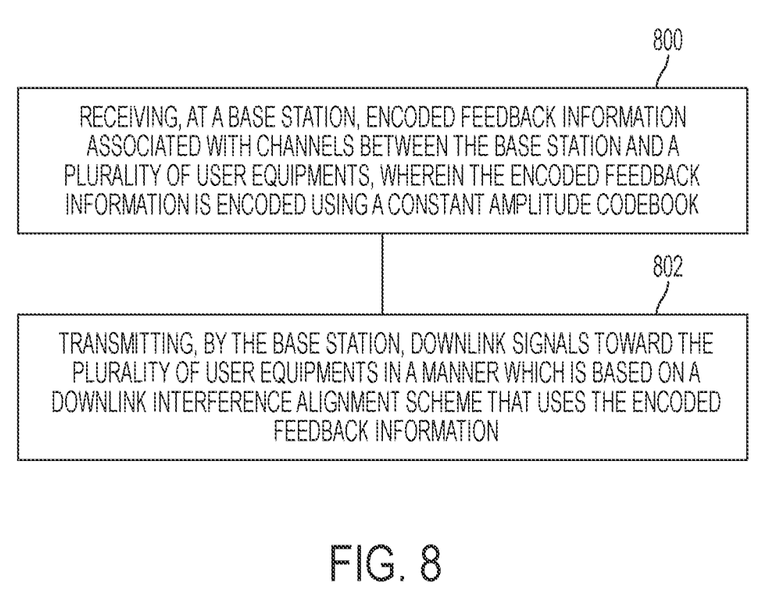
FIGS. 8 and 9 are flow diagrams illustrating methods for transmitting and receiving downlink signals, respectively, according to embodiments.
Figure 9:
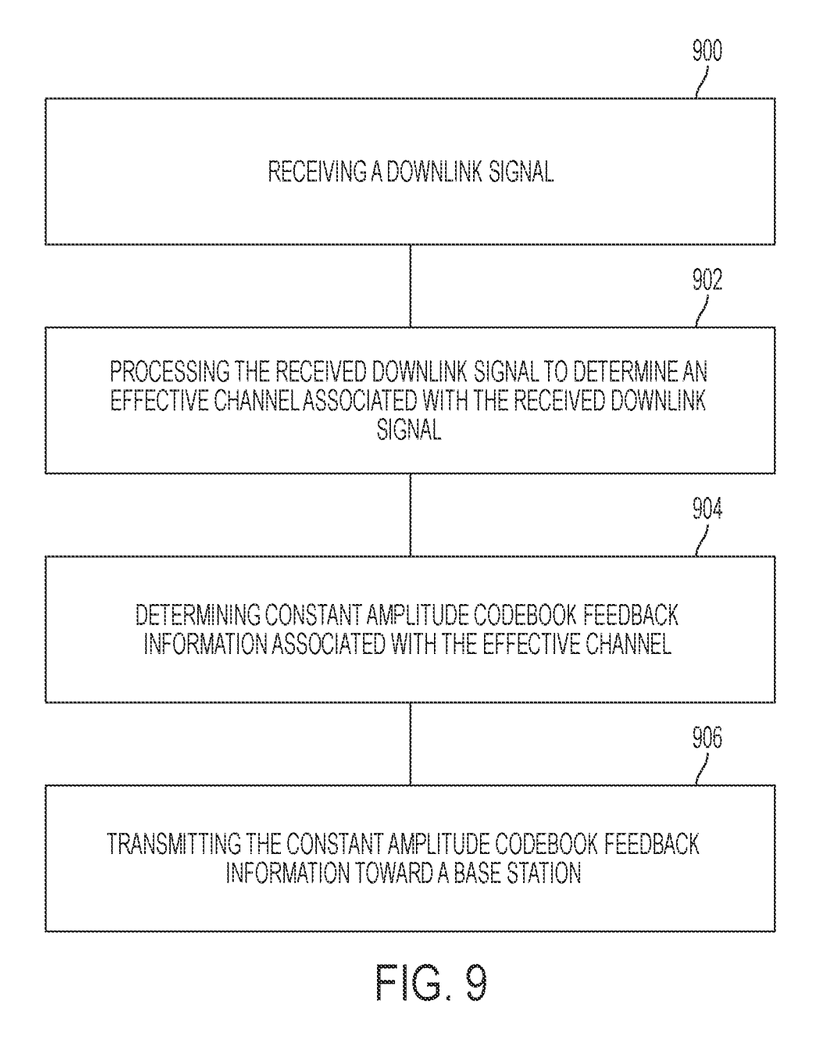

Based on the foregoing, it will be apparent that embodiments can be characterized as methods for transmitting or receiving downlink signals, examples of which are provided in the flow diagrams of FIGS. 8 and 9. For example, FIG. 8 illustrates a method for transmitting downlink signals in a radio communication system. At step 800, encoded feedback information associated with channels between a base station and a plurality of user equipments is received at the base station, wherein the encoded feedback information is encoded using a constant amplitude codebook. In this context a base station can be any node or access point in a radio communication system via which user equipment communicates over an air interface. At step 802, the base station transmits downlink signals toward the plurality of user equipments in a manner which is based on a downlink interference alignment scheme that uses the encoded feedback information.

FIG. 9 depicts a method for transmitting downlink signals in a radio communication system wherein, at step 900, a downlink signal is received, e.g., by a user equipment. In this context, a user equipment can be any device capable of receiving a radio signal over an air interface from an access point or network node, e.g., a mobile phone, a computer, an appliance, a tablet or notebook, a car, etc. The method continues, at step 902, by processing the received downlink signal to determine an effective channel associated with the received downlink signal. Constant amplitude codebook feedback information associated with the effective channel is determined by the user equipment at step 904 and this information is transmitted, at step 906, toward a base station.

Figure 10:
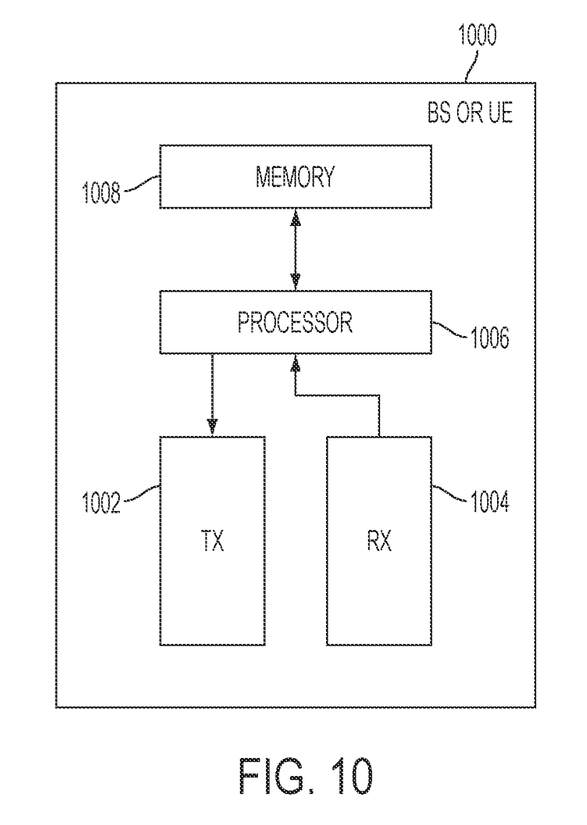
FIG. 10 depicts an exemplary base station or user equipment in which embodiments can be implemented.

The embodiments described above also implicate changes to base stations and user equipment which apparatuses are generically represented by FIG. 10. Therein, the base station or user equipment 1000 will typically include a transmitter 1002 and receiver 1004, collectively sometimes referred to as a "transceiver". In conjunction with processor 1006, these elements can be configured to perform, for example, the functions described in the flow diagrams of FIGS. 8 and 9. A memory device 1008 can also be provided in which to store data and software code associated with the various embodiments. When configured as a base station, apparatus 1000 will also have an interface (not shown) toward the network, e.g., to receive scheduling information if a scheduler is not included in the base station.

It will be appreciated by those skilled in the art that FIG. 10 represents a significant simplification of base station and user equipment circuitry and architecture which is provided here to avoid obscuring the embodiments. Thus, the method steps performed by the UE or base station can be performed by functional elements of the processing circuitry. In some embodiments these functions are carried out by appropriately programmed microprocessors or microcontrollers, alone or in conjunction with other digital hardware, which may include digital signal processors (DSPs), special-purpose digital logic, and the like. Either or both of the microprocessors and digital hardware may be configured to execute program code stored in memory. Again, because the various details and engineering tradeoffs associated with the design of, e.g., baseband processing circuitry for mobile devices and wireless base stations are well known and are unnecessary to a full understanding of the invention, additional details are not shown here.

Program code stored in the memory circuit 1008 may comprise one or several types of memory such as read-only memory (ROM), random-access memory, cache memory, flash memory devices, optical storage devices, etc., and includes program instructions for executing one or more telecommunications and/or data communications protocols, as well as instructions for carrying out one or more of the techniques described herein, in several embodiments. Of course, it will be appreciated that not all of the steps of these techniques are necessarily performed in a single microprocessor or even in a single module.

The above-described exemplary embodiments are intended to be illustrative in all respects, rather than restrictive, of the present innovation. Thus the present innovation is capable of many variations in detailed implementation that can be derived from the description contained herein by a person skilled in the art. All such variations and modifications are considered to be within the scope and spirit of the present innovation as defined by the following claims. No element, act, or instruction used in the description of the present application should be construed as critical or essential to the invention unless explicitly described as such. Also, as used herein, the article "a" is intended to include one or more items.

The invention claimed is:

1. A method for transmitting downlink signals in a radio communication system comprising:
   receiving, at a base station, encoded feedback information associated with channels between the base station and a plurality of user equipments, wherein the encoded feedback information is encoded using a constant amplitude codebook; and
   transmitting, by the base station, downlink signals toward the plurality of user equipments in a manner which is based on a downlink interference alignment scheme that uses the encoded feedback information, wherein the downlink interference alignment scheme involves limiting interfering signals from transmitter-receiver pairs in a group of transceiver-receiver pairs associated with the base station and the plurality of user equipments by relegating the interfering signals to a smaller signal dimension relative to desired signals.

2. The method of claim 1, wherein the encoded feedback information provides information about only a phase of the channels between the base station and the plurality of user equipments.

3. The method of claim 2, further comprising the steps of:
   decoding the encoded feedback information using the constant amplitude codebook to generate the information about only a phase of the channels.

4. The method of claim 1, further comprising:
   receiving, by the base station, additional feedback information associated with channel quality indications (CQIs); and
   scheduling, by the base station, the transmission of the downlink signals toward the plurality of user equipments based on their corresponding CQI.

5. The method of claim 4, wherein the step of scheduling further comprises:
   adjusting an order in which the transmission of the downlink signals is to be performed using a rate balancing factor.

6. A base station comprising:
   a transceiver configured to receive encoded feedback information associated with channels between the base station and a plurality of user equipments, wherein the encoded feedback information is encoded using a constant amplitude codebook, wherein the encoded feedback information provides information about only a phase of the channels between the base station and the plurality of user equipments;
   wherein the transceiver is further configured to transmit downlink signals toward the plurality of user equipments in a manner which is based on a downlink interference alignment scheme that uses the encoded feedback information; and
   wherein the transceiver is further configured to decode the encoded feedback information using the constant amplitude code book to generate the information about only a phase of the channels.

7. The base station of claim 6, wherein the downlink interference alignment scheme involves limiting interfering signals from transmitter-receiver pairs in a group of transceiver-receiver pairs associated with the base station and the plurality of user equipments by relegating the interfering signals to a smaller signal dimension relative to desired signals.

8. The base station of claim 6, wherein the transceiver is further configured to receive additional feedback information associated with channel quality indications (CQIs) and is configured to schedule the transmission of the downlink signals toward the plurality of user equipments based on their corresponding CQI.

9. The base station of claim 8, wherein the transceiver is further configured to adjust an order in which the transmission of the downlink signals is to be performed using a rate balancing factor.

10. A user equipment comprising:
a transceiver configured to receive a downlink signal, wherein the downlink signal is transmitted in a manner which is based on a downlink interference alignment scheme, and wherein the received signal is part of a downlink interference alignment scheme which involves limiting interfering signals from transmitter-receiver pairs in a group of transceiver-receiver pairs associated with a base station and a plurality of user equipments by relegating the interfering signals to a smaller signal dimension relative to desired signals; and
a processor configured to process the received downlink signal to determine an effective channel associated with the received downlink signal and further configured to determine constant amplitude codebook feedback information associated with the effective channel,
wherein the transceiver is further configured to transmit the constant amplitude codebook feedback information toward a base station.

11. The user equipment of claim 10, wherein the encoded feedback information provides information about only a phase of the channel between the base station and the user equipment.

12. The user equipment of claim 10, wherein the transceiver is further configured to pre-equalize the received downlink signal to compensate an amplitude matrix due to the usage of the constant amplitude codebook for feedback information.

13. The user equipment of claim 10, wherein the transceiver is further configured to transmit additional feedback information associated with channel quality indications (CQIs) and is configured to schedule the transmission of the downlink signals toward the plurality of user equipments based on their corresponding CQI.

14. A method for receiving downlink signals in a radio communication system comprising:
receiving a downlink signal, wherein the downlink signal is transmitted in a manner which is based on a downlink interference alignment scheme;
processing the received downlink signal to determine an effective channel associated with the received downlink signal;
determining constant amplitude codebook feedback information associated with the effective channel;
transmitting the constant amplitude codebook feedback information toward a base station; and
pre-equalizing the received downlink signal to compensate an amplitude matrix due to the usage of the constant amplitude codebook for feedback information.

15. The method of claim 14, wherein the received signal is part of a downlink interference alignment scheme which involves limiting interfering signals from transmitter-receiver pairs in a group of transceiver-receiver pairs associated with a base station and a plurality of user equipments by relegating the interfering signals to a smaller signal dimension relative to desired signals.

16. The method of claim 14, wherein the constant amplitude feedback information provides information about only a phase of the channel between the base station and the user equipment.

* * * * *